United States Patent [19]

Weikert

[11] 3,941,306

[45] Mar. 2, 1976

[54] A SYSTEM OF INTERCONNECTED, SEALED AND UNSEALED BAGS
[76] Inventor: Roy J. Weikert, Corrington, Ohio
[22] Filed: Jan. 24, 1974
[21] Appl. No.: 436,104

Related U.S. Application Data
[62] Division of Ser. No. 256,769, June 23, 1972, Pat. No. 3,813,845.

[52] U.S. Cl. .................................. 229/53; 229/69
[51] Int. Cl.² .................. B65D 33/00; B65D 27/10
[58] Field of Search ............................... 229/69, 53

[56] References Cited
UNITED STATES PATENTS
3,559,874  2/1971  Titchenal ............................. 229/69
3,791,573  2/1974  Titchenal et al. ..................... 229/69

Primary Examiner—William Price
Assistant Examiner—Stephen P. Garbe
Attorney, Agent, or Firm—Biebel, French & Bugg

[57] ABSTRACT

A web of bag blanks, a method of making the web, and apparatus and method for filling and sealing the bags in the web. The web is formed as a continuous tube having spaced, transverse seal lines extending from a lower edge of the web to a point short of the upper edge. The bags are filled and sealed on a machine having an elongated filling pipe which is threaded into the tube between its upper edge and the upper ends of the transverse seal lines. After the bags are filled, a continuous, longitudinal, seal line is formed, intersecting the upper ends of the spaced seal lines to seal the filled bags. The tube is then severed intermediate its upper edge and the continuous longitudinal seal line to separate the filled, sealed bags from the filling pipe.

7 Claims, 11 Drawing Figures

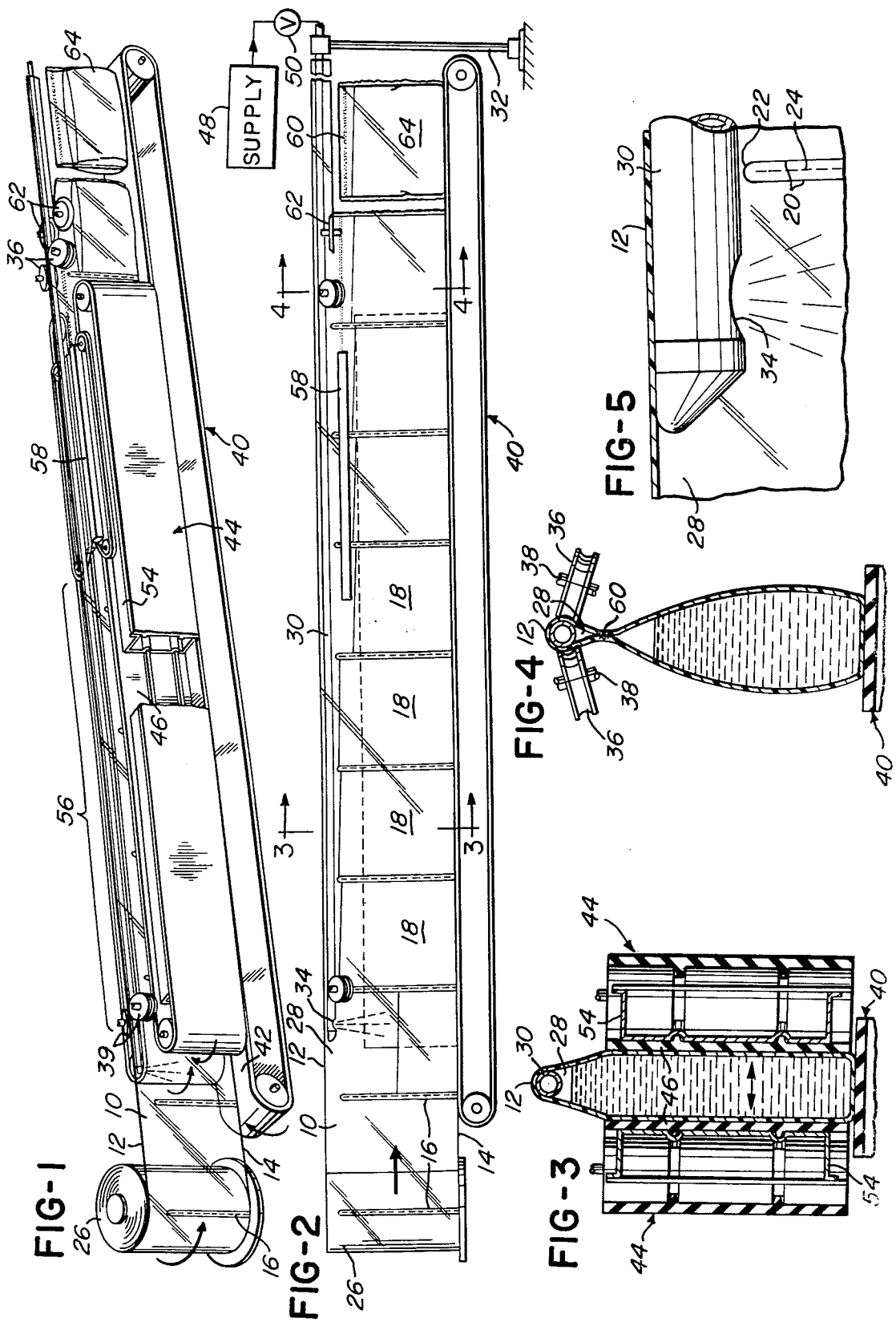

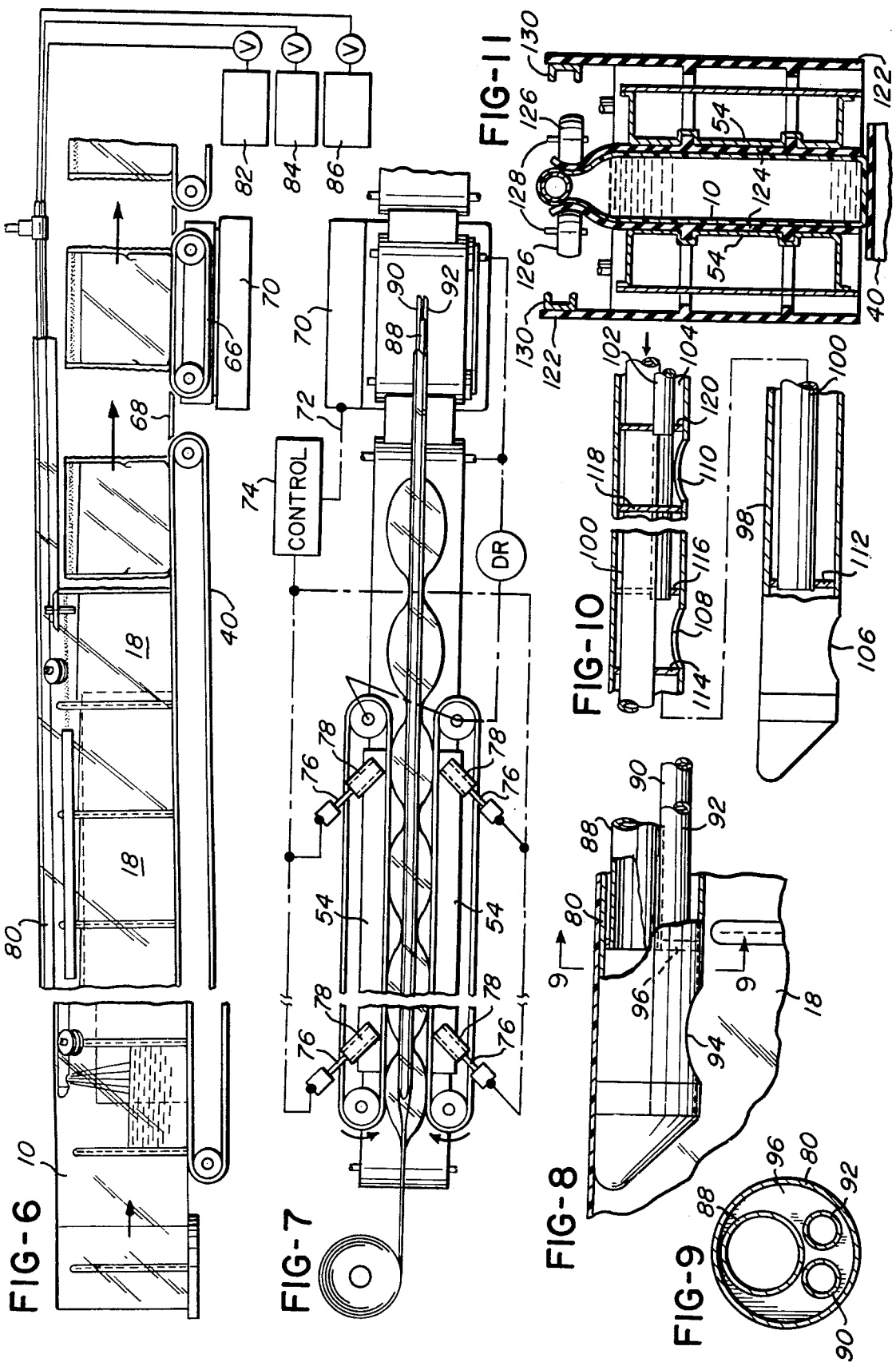

SYSTEM OF INTERCONNECTED, SEALED AND UNSEALED BAGS

This is a division of application Ser. No. 256,769, filed June 23, 1972 now U.S. Pat. No. 3,813,845.

BACKGROUND OF THE INVENTION

The filling and sealing of containers on a high volume basis generally requires fairly sophisticated equipment and several patents have issued in recent years on machines for this purpose. In the specific field of bag packaging, U.S. Pat. Nos. 2,877,609; 2,923,111; 3,269,278; 3,381,446; 3,462,913; and 3,492,783 are typical of patents disclosing machines and methods for filling and sealing bags on a high volume basis.

In each of the above noted patents a web of flexible packaging material, commonly a thermoplastic material, is folded longitudinally and provided with spaced, transverse sealing lines, typically heat seal lines, to divide the web into a series of interconnected compartments which are thereafter filled with the desired product and their open ends sealed, again, usually by means of a heat seal.

In some of these disclosures, for example U.S. Pat. No. 3,492,783, the transverse seal lines extend from the bottom edge to a point short of the top edge to provide a pair of continuous free edges, apparently to permit the upper edges to be spread by a plow-like member to facilitate insertion of a filling nozzle into each of the compartments.

While each of the systems disclosed in the above noted patents would appear to offer advantages over a manual packaging operation, it will be apparent that such systems are necessarily rather complicated since they require fairly precise indexing of the filling mechanisms with the remaining components of the apparatus. Additionally, where sterile packaging is required, it will be apparent that sterile packaging will be difficult, if not, as a practical matter, impossible, to attain where the bags are formed initially from an open web which is thereafter folded and sealed.

Where the product being packaged is a fluent one, such as, but not necessarily, a liquid, metering of the correct amount of the product into the packages will obviously present technical problems which must be resolved to create a successful system. Further, if a package is accidentally overfilled, it will be seen that spillage may result requiring termination of the packaging operation to permit cleaning the apparatus.

SUMMARY OF THE INVENTION

In accordance with the present invention a web of bag blanks is formed from a continuous, closed tube of packaging material. Preferably the tube is formed by extrusion and is thereafter flattened to provide upper and lower, longitudinally extending edges and transverse seal lines are formed in the flattened tube extending from the lower edge thereof to a point spaced from the upper edge to define a continuous channel running along the upper edge of the tube and interconnecting the compartments formed by the spaced, transverse seal lines.

The resulting web of bag blanks may, of course, be fed directly on an in-line process to the packaging machine of the present invention. However, it will usually be desirable to accumulate the web of bag blanks in some convenient form, such as a roll, which is subsequently used in the filling and sealing machine of the present invention.

In the latter type of operation, the roll of bag blanks is placed on the unwind stand of the filling and sealing machine, unrolled, and the above noted longitudinally extending channel running along the upper edge of the tube threaded onto an elongated filling pipe having an outlet at its discharge end adjacent the upstream end of the machine and supported at its inlet end adjacent the downstream end of the machine in cantilever fashion.

Means is also provided for continuously feeding the tube from the supply thereof on the unwind stand along the filling pipe in a direction away from the discharge end of the pipe toward its inlet end. This may include conveyors or feed rollers and preferably, a combination of both. Thus, a pair of grooved feed rollers may be positioned adjacent the inlet end of the filling pipe forming a pressure nip therewith and gripping the tube adjacent its upper edge to draw the tube along the filling pipe.

Additionally, a substantially horizontally oriented bottom conveyor may extend from adjacent the unwind stand to the inlet end of the filling pipe to support the lower edge of the tube during the filling process and to assist in conveying the tube as it moves through the machine in a downstream direction. Side conveyor belts having opposed, substantially vertically extending reaches are preferably positioned on opposite sides of the filling pipe to engage and support the side walls of the tube as it is filled and to also assist in conveying the tube through the filling and sealing machine.

In accordance with a further feature of the present invention, the horizontal conveyor and the filling pipe may be inclined at a slight angle with respect to the horizontal, diverging upwardly with respect to the horizontal in a downstream direction. As the product being packaged is deposited in a compartment formed in the tube, the excess may spill over, back down into following compartments, thereby preventing spillage and also serving as an automatic metering system to insure that the correct amount of the filling material is deposited in each package.

In this regard metering plates will be positioned within the loops of the side conveyor belts in engagement with the aforementioned vertically extending reaches. Thus, by adjusting the spacing between the metering plates expansion of the packages may be controlled. By then assuring adequate flow through the filling pipe to give some overflow, the compartments will be filled to a level determined by the upper ends of the transverse seal lines, interconnected as discussed below, with overflow passing back into following compartments.

As the compartment leave the metering area defined by the metering plates, the bags may expand, lowering the level of product deposited therein. Thereafter, a continuous longitudinally extending seal line is formed along the tube intersecting the upper ends of the transverse seal lines and sealing the product in individual bags holding the desired quantity. Of course, in place of the above described metering system a simple metering valve may be provided in the product supply line or conventional metering apparatus for measuring on a weight basis may be used.

Regardless of the type of metering used, after the product is sealed in the individual bags, the tube is severed longitudinally intermediate its upper edge and the longitudinally extending seal line to free the bags from the filling pipe. The filled, sealed bags may, of course, be retained in interconnected form if desired, but usually, it will be desirable to separate the filled bags from each other.

With this in mind, the transverse seal lines are preferably formed in closely spaced pairs connected at their upper ends in an inverted-U-configuration with a line of serrations extending between the legs of the U. With this construction it has been found that the bulging of the bags upon filling will automatically cause the bags to separate from each other, although, it will be apparent that positive separating means, such as conveyor at the downstream end of the machine running at a higher speed than the rate of tube feed, might also be utilized for this purpose. Additionally, by connecting the seal lines at their upper ends the product is prevented from seeping between the bags during the filling process.

In accordance with a modified form of the invention, weighing apparatus may be associated with the machine adjacent the downstream end thereof for weighing each of the filled bags after they have separated from the web of bags. The weighing station is connected to a servo-control mechanism which operates in response to weight information fed into it to adjust automatically the spacing between the metering plates. Therefore, any variances in the weight of the filled bags from some preselected value or range of values will result in a compensating adjustment of the spacing of the metering plates.

In another modification of the present invention, the filling pipe may in fact, include multiple pipes delivering multiple fluent materials at spaced locations along the filling line. For example, one of the multiple pipes may inject sterilizing gas into the compartments at a point adjacent the upstream end of the filling line to sterilize the interior of each of the compartments.

At a location downstream therefrom a food product such as milk, for example, is thereafter deposited into the compartments through a second of the multiple pipes, displacing the sterilizing gas in the compartment. At an additional location additives, such as flavoring or coloring, may then be added through additional ones of the multiple pipes.

It will also be seen that the multiple pipe filling pipe finds utility in packaging compounds that interreact in atmosphere by permitting the filling of each of the compartments with an inert gas, such as nitrogen, and then injecting the chemical compounds into the inert gas filled compartment. In its simpliest form this embodiment of the invention may include the injecting of several products which it is desired to mix into the compartments at the same point along the filling line.

It will also be seen that the side conveyor belts, in accordance with another embodiment of the invention, may be extended upwardly to lie on opposite sides of the filler pipe, engaging the tube threaded over the pipe. The belts are maintained in engagement with the tube by means of rollers bearing against the inside surfaces of the side conveyor belts. This not only provides additional support for the tube but eliminates the necessity of synchronizing the speeds of the side conveyor belts and supporting rollers.

BRIEF DESCRIPTION OF THE DRAWINGS

FIG. 1 is a perspective view showing a filling and sealing system in accordance with the present invention;

FIG. 2 is a side elevational view, with portions removed, of the packaging system of the present invention;

FIG. 3 is a view taken of line 3—3 of FIG. 2;

FIG. 4 is a view taken on line 4—4 of FIG. 2;

FIG. 5 is an enlarged fragmentary view of the upstream end of the filling nozzle;

FIG. 6 is a view similar to FIG. 2 of the drawings, but showing a modification of the invention wherein a weighing station is utilized to control the spacing between the metering plates and the feed pipe is fed from multiple product sources;

FIG. 7 is a plan view of the modification of FIG. 6;

FIG. 8 is a side view, with parts in section, showing an embodiment wherein the filling pipe is formed of multiple pipes feeding the compartments at the same point;

FIG. 9 is a cross sectional view taken on line 9—9 of FIG. 8;

FIG. 10 is a side view, with parts in section, showing a further preferred embodiment wherein the filling pipe is formed as multiple pipes feeding the compartments at spaced locations along the filling line; and FIG. 11 is a cross sectional view showing a modification of the conveyor means for the tube of bags.

DESCRIPTION OF THE PREFERRED EMBODIMENTS

A web 10 of bag blanks in accordance with the present invention is formed as a continuous, closed tube having upper and lower edges 12 and 14, respectively, and transverse seal lines 16 extending from the lower edge to a point spaced from the upper edge thereof, thereby dividing the tube into a series of interconnected compartments 18.

The tube may conveniently be formed by extrusion of a thermoplastic such as polyethylene or polypropylene, or composites, coextruded or laminated, and the transverse seals 16 may be formed as heat seal lines of, as best seen in FIG. 5, substantially U-shaped configuration having spaced parallel legs 20 joined at their upper ends by a bight portion 22. A line of serrations 24 may also be provided extending intermediate the parallel legs 20 of each of the transverse seals 16.

While the formation of the tube is described as preferably being formed in an extrusion process, since this offers many advantages such as ease of production and the formation of a tube having a sterile interior, it will be apparent that the tube might be formed in other ways, such as by merely folding a web longitudinally and sealing its upper edge or joining two webs with longitudinally extending seal lines.

Additionally, it will be apparent that the formation of the web of bag blanks might be on an in-line process with the filling and sealing process. However, it will usually be desired to form the web separately from the sealing and filling operation and accumulate the web in some convenient form, such as the roll 26 shown in FIGS. 1 and 2 of the drawings.

Regardless of this, however, in the filling and sealing operations, the web of bag blanks is thereafter fed into the filling and sealing apparatus with the longitudinal channel 28 defined by the upper edge of the tube and the upper ends of the transverse seal lines 16 threaded along an elongated filling pipe 30. Filling pipe 30 is supported adjacent its inlet end by any convenient means, such as that shown somewhat schematically at 32 in FIG. 2 of the drawings, to extend in cantilever fashion in an upstream direction, and is provided at its discharge end with an outlet 34.

A pair of grooved feed rollers 36, driven by axles 38, are positioned adjacent the inlet end of the filling pipe 30, and form therewith, as best seen in FIG. 4 of the drawings, a pressure nip in which the tube is gripped adjacent its upper edge. Thus, rotation of the feed rollers will cause the tube to be drawn along the filling pipe in a downstream direction. In addition to rollers 36, idler rollers 39, also grooved, may be rotatably mounted adjacent the upstream end of the machine to provide additional support for pipe 30 at its discharge end.

To assist in conveying the tube through the filling and sealing machine and to provide support for the lower edge of the tube, a bottom conveyor 40 having a substantially horizontal reach 42 extends substantially coextensively with the feed pipe through the machine. Additionally, side conveyors 44 having substantially vertically extending reaches 46 are positioned on opposite sides of the feed pipe to support the tube on opposite sides thereof and assist in conveying the tube through the filling and sealing machine.

The product to be packaged is delivered from a supply 48 thereof, FIG. 2, to the inlet end of the feed pipe and the product flows through the feed pipe for ejection through the outlet 34 thereof into the compartments 18. The flow of the product may then be controlled by means of a metering valve 50 or some other conventional metering apparatus of, for example, the type which weighs the amount of product packaged and controls the metering valve to correct for under or overweight packages.

If desired, however, metering may also be accomplished by means of movable back up plates. Thus, the filling and sealing machine may be provided, as seen in FIGS. 1 through 3 of the drawings, with metering plates 54 of substantially U-shaped configuration provided within the loops of the side conveyors in engagement with the vertically extending reaches 46 thereof. The spacing between the metering plates 54 is adjustable, as indicated by the double headed arrows in FIG. 3 of the drawings, so that by assuring an adequate flow of product through the filler pipe 30 and selecting the proper size compartments 18, the amount of product deposited in compartments 18 may be controlled by adjusting the spacing between the metering plates 54.

Thus, any excess deposited in each of the compartments through the outlet 34 will run over and flow into adjacent compartments. By inclining the side conveyor belts 46, the bottom conveyor reach 42, the sealing apparatus, and the filler pipe 30 at a slight angle to the horizontal, as seen in FIG. 2, this flow will be in an upstream direction into following compartments 18. In this regard it will be noted that by interconnecting the transverse seal lines in each pair at their upper ends flow of the product into the spaces between the seal lines is prevented.

As filled compartments leave the metering section 56 defined by the metering plates 54 the bags are allowed to relax somewhat, lowering the level of the product therein below the upper ends of the transverse heat seal lines 16. Thereafter, a longitudinally extending seal line is formed in the tube by appartus such as that schematically indicated at 58, which may take the form of a band sealer, with the longitudinal seal line 60 intersecting the ends of the transverse seal lines 16.

Cutting means, such as cutting wheels 62, may be positioned downstream of the sealer 58 to sever the tube intermediate its upper edge and the longitudinally extending seal line 60 to free the filled bags from the filling pipe. Normally, bulging of the filled bags will cause them to separate along the lines of serrations 24 to provide the individual filled, sealed bags 64 shown adjacent the downstream end of the apparatus in FIGS. 1 and 2 of the drawings. It will be apparent, however, that positive separating means may be utilized.

Turning now to FIGS. 6 and 7 of the drawings, a modification of the present invention will be described. Like reference numerals in FIGS. 6 and 7 indicate the same parts as those shown in FIGS. 1 through 5 of the drawings. In addition to these parts, it will be noted that adjacent the downstream end of the machine a short conveyor section 66 is provided, with the gap between conveyor 66 and bottom conveyor 40 bridged by a plate 68.

Conveyor 66 is associated with a weighing device 70 which weighs each individual, filled bag as it leaves the bottom conveyor 40. In this regard, the conveyor 66 may be operated at a somewhat higher speed than the conveyor 40 to insure that only one filled bag at a time passes over the weighing device 70.

The weighing device 70 may be of the conventional, quick registering type and signals from device 70 are transmitted over line 72 to a control mechanism 74 of, for example, the servo-control type. Control 74 in turn controls the rotation of threaded screws 76 extending diagonally on each side of the machine adjacent the upstream and downstream ends of the metering section 56.

The metering plates 54 are slidably mounted on the machine and are provided with internally threaded blocks 78 receiving the threaded screws 76. With the above construction it will be apparent that each filled bag will be individually weighed as it passes over the weighing device 70. If the bag is underweight the screws 76 will cause the two metering plates 54 to separate some small amount allowing a greater charge to be placed in the bags.

If, after some predetermined time interval, bags passing over the weighing section 70 are still found to be underweight, the plates 54 will again back away from each other some small amount and this process will be repeated until the weight of the bags falls within some preselected range of values. Conversely, if the bags are found to be overweight, suitable adjustment of the spacing between the metering plates will be made, causing the plates to move closer together and decreasing the weight of the filled bags.

It will also be noted from FIGS. 6 and 7 of the drawings that filling pipe 80 is formed as a multiple pipe fed from three separate sources, 82, 84 and 86, communicating with the compartments 18 through individual pipes 88, 90 and 92. The multiple pipe arrangement may, as seen in FIGS. 8 and 9, take the form of individual pipes discharging through a single outlet 94 into the compartments 18. For example, the pipes may have their discharge ends secured in a plate 96 which seals the end of the pipe and prevents backflow in the outer pipe 80 through the spaces between the pipes 88, 90 and 92.

In accordance with another modification of the invention, it will be noted from FIG. 10 that a filler pipe 98 may include multiple pipes 100, 102 and 104 feeding through spaced outlets 106, 108 and 110 respectively. Preferably the area on either side of each of the outlets is sealed to prevent infiltration of the product into the outer pipe 98. In this regard, plate 112 is positioned adjacent the outlet 106, plates 114 and 116 are positioned on either side of the outlet 108 and plates 118 and 120 are positioned on either side of the outlet 110.

With this configuration, it will be seen that multiple products may be deposited in the compartments at spaced locations along the filling line. These products might comprise materials which are to be intermixed in some preselected order, or pipe 100 could be used to fill the compartments with a sterilizing gas or an inert gas which is later displaced by material to be packaged, deposited into the compartments through the pipes 102 and 104.

FIG. 11 of the drawings shows another preferred embodiment in accordance with the present invention. As seen in FIG. 11, side conveyor belts 122 extend upwardly on opposite sides of the bottom conveyor belt 40 and the metering plates 54. Unlike the conveyor belts 44, however, the vertically extending reaches 124 of the belts extend upwardly on opposite sides of the filling pipe.

Rollers 126 are rotatably mounted by means of axles 128 and press the upper edges of the conveyor belts against the tube or web 10 and against the filler pipe to provide firm support for the web and at the same time eliminate the necessity of synchronizing the speed of the side conveyor belts with the speed of the feed rollers which regulate the travel speed of the film.

Thus, rollers such as those shown at 36 in FIG. 1 of the drawings are eliminated, since they are unnecessary when using extended side conveyor belts. At their outer reaches the upper edges of the side conveyor belts may be supported in any convenient manner, such as by the longitudinally extending channels 130 positioned within the belts as shown in FIG. 11 of the drawings.

From the above it will be seen that the present invention provides a unique web of bag blanks, a method of making the web and apparatus and method for filling and sealing the bags thereof.

While the product, process, method and apparatus herein described constitute preferred embodiments of the invention, it is to be understood that the invention is not limited to the precise examples given herein, and that changes may be made therein without departing from the scope of the invention.

What is claimed is:
1. A web of bags comprising:
a. a continuous flattened tube of material,
b. said flattened tube having opposed upper and lower longitudinal edges,
c. regularly spaced seal lines extending transversely of said flattened tube,
d. each of said seal lines extending from said lower edge of said flattened tube to a point closely adjacent to but spaced from said upper edge of said tube,
e. said transversely extending seal lines dividing said tube into a series of interconnected bags with said transversely extending seal lines forming sides of said bags, said lower edge of said web forming bottoms of said bags and said upper edge of said web defining a continuous conduit extending across said bags,
f. a longitudinally extending seal line intersecting some of said transversely extending seal lines,
g. said longitudinally extending seal line sealing closed those bags the transversely extending seal lines of which it intersects,
h. said seal lines defining with said flattened tube a system consisting of interconnected, sealed and unsealed bags and said continuous conduit extending across upper ends of each of said interconnected sealed and unsealed bags with said unsealed bags communicating directly with said conduit, and
i. means for separating said interconnected bags from each other along the sides thereof.
2. The package of claim 1 wherein:
a. said unsealed bags are in communication with each other via said closed conduit.
3. The web of claim 1 wherein:
a. each of said transversely extending seals includes a pair of transversely extending seal lines and a third seal line interconnecting the seal lines of the pair, forming a continuous, substantially U-shaped seal line with said pair of seal lines constituting spaced parallel legs of said U-shaped seal and said third seal line forming the bight portion thereof.
4. The web of claim 3 wherein:
a. said separating means are disposed between said spaced parallel legs of said U-shaped seals, extending adjacent to but not beyond said third seals, whereby a fluid deposited in one of said bags may flow, prior to closing of that bag, from the bag in which it is deposited into an adjacent, open bag via said continuous conduit.
5. The web of claim 1 further comprising:
a. a fluid deposited in some of said bags within said system thereof.
6. The web of claim 5 wherein:
a. said fluid comprises a liquid.
7. The web of claim 5 wherein:
a. said fluid comprises a gas.

* * * * *